United States Patent [19]

Pere et al.

[11] Patent Number: 4,513,630
[45] Date of Patent: Apr. 30, 1985

[54] MOTION CONVERSION MECHANISM

[75] Inventors: Gérard Pere; Roger Badaut, both of Le Breuil, France

[73] Assignee: Creusot-Loire, Paris, France

[21] Appl. No.: 395,378

[22] Filed: Jul. 6, 1982

[30] Foreign Application Priority Data

Jul. 30, 1981 [FR] France ................................ 81 14898

[51] Int. Cl.³ .................... F16H 23/00; H03K 19/20; F01B 3/00; F01B 13/04
[52] U.S. Cl. ........................................ 74/60; 91/505; 91/506; 417/222; 92/12.2
[58] Field of Search ...................... 74/60; 91/505, 506; 417/222; 92/12.2; 308/214

[56] References Cited

U.S. PATENT DOCUMENTS

| | | | |
|---|---|---|---|
| 2,130,258 | 9/1938 | Baker et al. | 308/214 |
| 2,302,995 | 11/1942 | Holmes | 74/60 |
| 3,760,692 | 9/1973 | Molly | 91/505 |
| 3,937,538 | 2/1976 | Zimmer et al. | 308/214 |
| 3,964,323 | 6/1976 | Seibert | 74/60 |
| 4,336,971 | 6/1982 | Reiter | 308/214 |

FOREIGN PATENT DOCUMENTS

| | | | |
|---|---|---|---|
| 2271459 | 12/1975 | France | 74/60 |
| 2453332 | 10/1980 | France . | |
| 2513549 | 10/1976 | Fed. Rep. of Germany | 91/505 |
| 2043181 | 10/1980 | United Kingdom | 91/505 |

Primary Examiner—Lawrence J. Staab
Assistant Examiner—Michael D. Bednarek
Attorney, Agent, or Firm—Pollock, Vande Sande & Priddy

[57] ABSTRACT

A mechanism for converting rotary motion in rectilinear to and fro comprising and hinged in the housing of a crosspiece by a prestressed rod and conical bearing. An even number of bearings stacked symmetrically on each side of the center and internal cages are fitted an intermediate bush with the interposition of spacing rings, the thicknesses of the rings being so determined that the pre-stressing force is distributed equally between the bearings and causes the complete take-up of play. The invention is particularly useful in multicylinder pump mechanisms distributed regularly around a shaft and with axial pistons.

5 Claims, 1 Drawing Figure

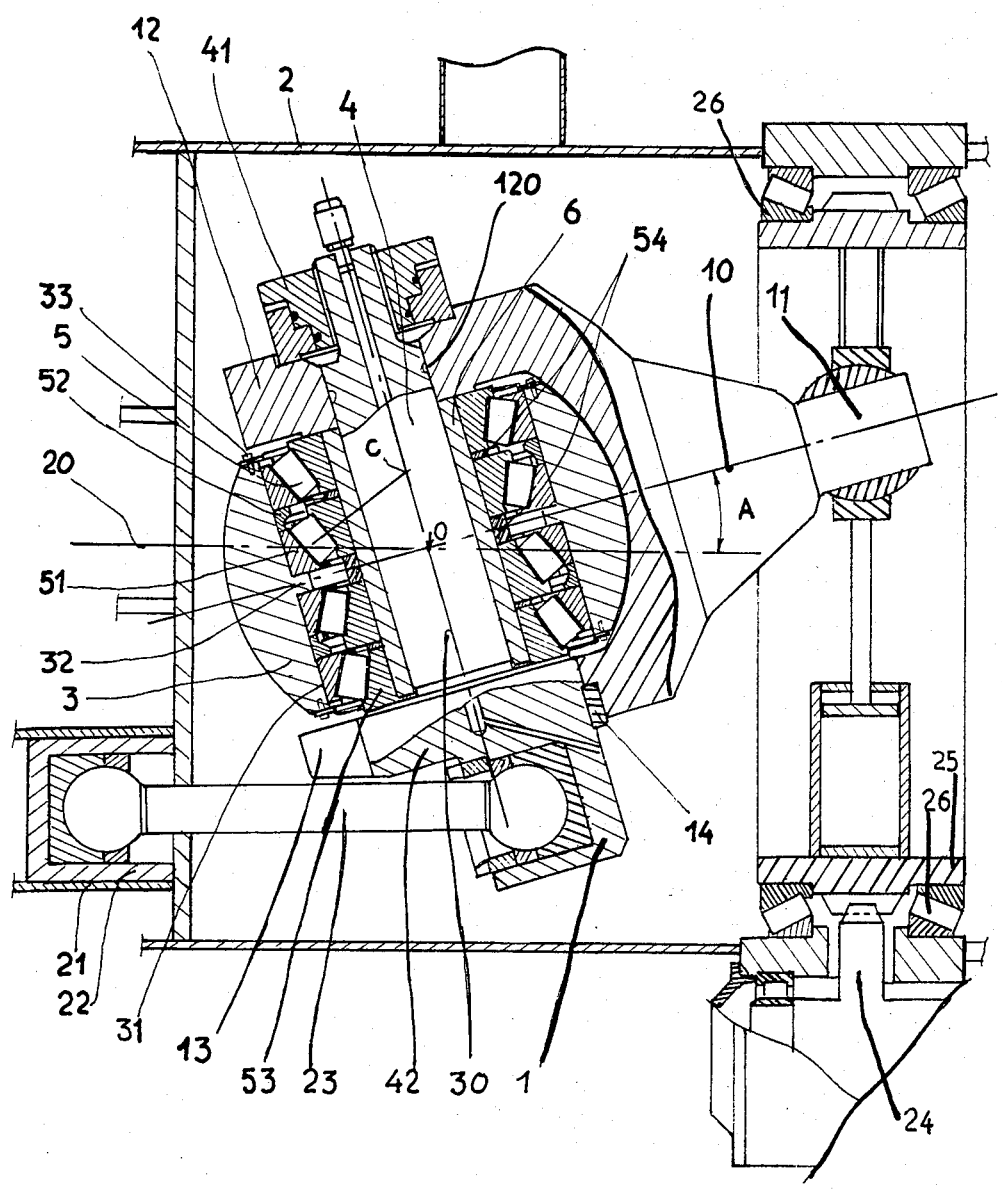

MOTION CONVERSION MECHANISM

FIELD OF THE INVENTION

The invention relates to a mechanism for the conversion of a rotary motion into a rectilinear to and fro motion capable, for example, of actuating a plurality of movable elements arranged symmetrically around a longitudinal axis. The invention is especially applicable to the actuation of axial piston pumps comprising a plurality of cylinders arranged symmetrically around a shaft and within which move alternately pistons connected by connecting rods to an oscillating plate driven by a motion of nutation around a center of oscillation located on the longitudinal axis.

To this end, the plate is hinged around the center of oscillation and it is provided with a crank-pin, directed along a direction passing through the center of oscillation and inclined with respect to the longitudinal axis, and rotated around this axis. The rotary movement of the crank-pin whose axis describes a cone having a center of oscillation as apex determines a motion of nutation of the plate on which are pivotally supported driving rods of the pistons which are thus driven with a to and fro movement. The mechanism is reversible, and the motion of the pistons can determine a rotary movement of the crank pin and consequently of the plate on which it is articulated.

Of course, it is necessary for the center of oscillation to be fixed, the plate being hinged on a housing on which are mounted on one side the cylinders and on the other the rotary-driving mechanism of the crank-pin.

BACKGROUND OF THE INVENTION

The articulation of the plate oscillating on the housing can be constructed in various ways and, for example, around a ball joint centered at the center of oscillation. However, especially in large and very powerful pumps, the construction of a spherical ball joint articulation capable of withstanding the forces developed is difficult and expensive.

This is why, to simplify the device, it has already been proposed to replace the ball joint by a Cardan joint. Applicants have described in French Pat. No. 2,271,459, an assembly of this type in which the Cardan joint is constituted by a cross-piece pivotally mounted around an axis passing through the center of oscillation and on which the plate is hinged, around a pivoting axis passing also through the center of oscillation and cutting the pivoting axis of the cross-piece at right angles. The plate is provided for this purpose with two spaced portions forming a yoke which caps the cross-piece and on which the ends of an assembly rod directed along the pivoting axis are supported.

Generally, for this type of device, the plate is hinged on the cross-piece around two spaced pivots centered on the pivoting axis and constituted preferably by roller bearings easy to assemble and to maintain. However, such roller bearings run the risk of withstanding such use badly since they are subject to alternate bending stresses on the oscillation of the plate.

This is why, in a second French Pat. No. 79-08735, filed Apr. 6, 1979, applicants have described an arrangement enabling the articulation to be subjected to pre-stressing force directed along the pivoting axis and applied to the assembly rod, for example, by means of a small jack located at the end of the latter and supported on the plate. Preferably conical bearings are used whose external cages are fixed in a cylindrical central housing arranged on the cross-piece in the pivoting axis and whose internal cages take up the pre-stressing force by being supported externally on the two portions of the yoke and internally, on one another, through a spacing ring located between them.

Hitherto, and particularly in French Pat. No. 79-08735, it was sought to space the two roller bearings and the spacing ring as much as possible which had, for this reason, a rather considerable width and tended to buckle. On the other hand, the possible replacement on site of the delicate parts of the mechanism had to be provided for, and particularly the articulation and, consequently, the mounting of the assembly had to be simplified as much as possible.

SUMMARY OF THE INVENTION

It is an object of the present invention to provide an arrangement enabling the alternate bending stresses to be withstood better, and the assembly of the articulation to be considerably simplified.

According to the invention, there are stacked over the whole height of the housing of the cross-piece a number of conical bearings whose load centers are spaced symmetrically on each side of the center of oscillation and whose internal cages are fitted onto a cylindrical bush itself fitted without play on the articulation rod and extending over the whole space comprised between the two portions of the yoke, and said internal cages are distributed over the whole length of the bush, leaving between them intervals in which spacing rings are inserted whose thickness is adjusted so that the pre-stressing force applied by the rod is distributed also between the bearings and causes at least a complete take-up of the play by elastic radial deformation of the cages, the internal cages being applied on the bush and the external cages on the cylindrical wall of the housing of the crosspiece.

According to an important feature of the invention, the length of the cylindrical bush and the thicknesses of the spacing rings are determined so that the bush is supported at its ends on the two portions of the yoke to take up the pre-stressing force exceeding the force necessary for taking up the play

BRIEF DESCRIPTION OF THE DRAWING

The invention will be better understood with reference to a particular embodiment shown by way of example in the accompanying drawing.

The single FIGURE is a view in axial section of the articulation according to the invention of an oscillating plate.

DESCRIPTION OF PREFERRED EMBODIMENT

The oscillating plate 1 is placed inside housing 2 centered on a longitudinal axis 20 passing through the center of oscillation O. On one side of the center O are located the cylinders 21 distributed regularly around the axis 20, one of them being been shown in section in the plane of the figure so as to show the piston 22 connected to the plate 1 through a rod 23 articulated at its ends.

On the other side of the center O is mounted, on the housing 2, a drive mechanism comprising a pinion 24 which meshes with on a wheel 25 centered on the axis of rotation 20 around bearings 26 mounted on the housing. On the drive plate 25 is hinged a crank-piece 11 centered on an axis 10 passing through the center of oscillation O and inclined with respect to the axis 20 at an angle A which can, if necessary, be adjusted by radial displacement of the crank-piece 11 to modify the stroke of the pistons 22 and consequently the flow rate when the latter constitute a pump.

It will be readily understood that, when the pinion 24 rotates the plate 25 and consequently the crank-piece 11, the axis 10 describes a cone having for apex the center of oscillation O around which the plate 1 is driven by a movement of nutation.

The cardan joint of the plate 1 is constituted by a cross-piece 3 pivotally mounted on the housing 2 around an axis perpendicular to the plane of the figure and passing through the center of oscillation O. The pivot is mounted inside a, central housing of the cross-piece 3 bounded by a cylindrical wall 31, whose axis 30 passes through the center O and is perpendicular on the one hand to the pivoting axis of the cross-piece and on the other hand to the axis 10 of the crank-piece 11.

The pivot is constituted essentially by a rod 4 whose ends 41 and 42 are respectively supported on two portions 12 and 13 of the plate forming a yoke which caps the central housing 31 of the cross-piece 3.

Pivoting is ensured by the conical bearings arranged in the housing 31 and centered on the rod 4.

Similarly to that described to that described in French Pat. No. 79-08735, the rod 4 bears one end 42 fastened to the portion 13 of the plate and which supports the ball joint of the connecting rod 23. The other end of the rod 4 passes through a bore 120 formed in the other portion 12 of the plate and is provided with a thread on which a clamping nut 41 engages. As already described in the foregoing patent application, the clamping nut can constitute a small jack determining a pre-stressing tension of the rod which is applied to the bearings. The essential feature of the invention resides in the mounting of the bearings and the manner in which the pre-stressing force is applied to them.

In fact, instead of using, conventionally, only two conical bearings spaced as much as possible from one another, a plurality of identical bearings is stacked over practically the whole height of the housing 31 of the cross-piece 3. Thus, in the example shown, four bearings 5 are stacked whose outer cages 51 have an external diameter equal to the internal diameter of the cylindrical wall 31 so as to be slide-fitted into the latter. Spacing rings 52 are inserted between the external cages 51 and have a height such that the group of bearings extends over a height equal to that of the housing 31 at the ends of which clamps 33 for fastening the assembly are placed. In addition, conical bearings are used whose effective load centers C are symmetrically spaced outwardly on each side of the center of oscillation O. The mounting of the bearings can be carried out before the positioning of the plate on each side of the cross-piece 3 and this is why the spacing ring placed at the center of the articulation can be constituted by an annular support bearing 32 fast to the cross-piece 3.

The inner cages 53 of the bearings are slide-fitted on to a cylindrical bush 6 which is itself fitted without play on to the articulation rod 4 and extends over the whole space comprised between the two portions 12 and 13 of the yoke of the plate.

The number and size of the bearings are selected so that the latter are distributed regularly along the ring 6 and the set of internal cages 53 covers practically the whole length of the bush 6. In the spaces between internal cages 53 are placed spacing rings 54 which, preferably, are also slide-fitted on to the bush 6 so that the set of internal cages 53 and spacing rings 54 covers the whole length of the bush.

By means of this arrangement, the pre-stressing force applied to the rod 4 may be taken up again by the bush 6 and on the other hand by the assembly of the stack of internal cages 53 and spacing rings 54. This is why this stack has a height slightly greater than the length of the bush 6 so that the pre-stressing force is taken up again in the first place by the bearings.

Due to the fact that conical bearings are used, this clamping force of the internal cages 53 determines an elastic radial deformation of the bearings, the internal cages 53 being applied inwardly against the wall of the bush 6 and the external cages 51 being applied outwardly against the cylindrical wall 31 of the central housing of the cross piece 3.

From geometric measurements of the bearings, of the housing 31 and of the bush 6, it is possible to calculate the radial deformations of the bearings and of the cross-piece due to the axial stress, and to adjust the thicknesses of the spacing rings 54 so that the load is distributed evenly between the bearings of which all the cages are applied outwardly on the cross-piece 3 and inwardly on the bush 6.

In this way, it is possible to take up all the radial play between the cages, bush 6 and housing 31, which is particularly important for taking up the alternate bendings imposed on the articulation.

On the other hand, having thus calculated the radial deformations and the axial compression of the stack of bearings, it is possible to give the bush 6 a length equal to the total height of the stack of the internal cages 53 and of the spacing rings 54, reduced by the compression enabling the play to be taken up. Thus, it is possible to exert on the rod 4 a pre-stressing tension greater than that necessary for taking up the play since the additional axial stress is taken up at this moment by the bush 6. The rod 4 thus pre-stressed, better withstands the alternate bendings.

In addition, according to another essential feature, the portion of the rod 4 comprised between the two portions 12 and 13 of the plate is entirely covered without slack by the bush 6 whose outer wall is itself entirely covered by the stack of bearings and of spacing rings 54 which exert on it radial operating stresses. In this way, all risk of buckling of the rod and of the bush is avoided.

However, the utilization, according to the invention, of a bush intermediate in length equal to the space between the two arms of the yoke has the further advantages of considerably simplifying the assembly of the articulation. In fact, the cross-piece 3 being mounted on its pivoting axle on the housing, it is possible firstly to space the bearings one after another in the housing 31, on each side of the annular bearing 32, by interposing the spacing rings 52 and 54 then by fixing the assembly by the clamps 33. The bush 6 is then fitted in and the asembly is capped by the yoke formed by the two portions 12 and 13 of the plate. It only remains to fit on to the plate and on to the bush the rod 4, whose support part 42 is slidably mounted in a bore formed on the portion 13 of the plate with respect to which it is locked by a key 14. The whole is clamped by the nut 41, the plate thus being mounted on its articulation and in condition to receive the large ends of the connecting rods 23.

By means of such an assembly, it was possible in the workshop to carry out adjustment of the spacing rings 54 so as to obtain the axial compression determining the desired radial deformation.

This very simple assembly not only enables the cost of the articulation to be lowered but also facilitates replacement of the parts most subject to wear.

What is claimed is:

1. Mechanism for converting a rotary motion into a rectilinear to-and-fro motion, comprising
   (a) an oscillating plate articulated about a pivoting axle on a supporting cross-piece pivotally mounted on a fixed housing about an axis intersecting said pivoting axle at a right angle at a center of oscillation;
   (b) said oscillating plate comprising two spaced portions forming a yoke capping said cross-piece and supporting two ends of a coupling rod aligned with said pivot axle and passing into a central housing of said cross-piece;
   (c) said central housing being bounded by an inner wall shaped as a cylinder of revolution about said pivoting axle;
   (d) outer conical bearing cages fastened on said inner wall and centered on said pivoting axle
   (e) said coupling rod being subjected to axial pre-stressing force taken up by inner cages of a bearing which are supported in axial direction and outwardly on two portions of said yoke, and inwardly on an annular spacer disposed between said yoke portions;
   (f) an even number of substantially identical conical bearings stacked over the entire height of said housing;
   (g) load center of said bearings being spaced symmetrically on either side of said center of oscillation;
   (h) said inner cages being fitted onto a cylindrical bush itself fitted without play onto said coupling rod and extending over the entire space comprised between said two yoke portions;
   (i) said inner cages being distributed over the entire length of said bush while leaving between them gaps in which are inserted spacer rings whose thickness is adjusted so that said pre-stressing force is distributed by said bearings and causes at least complete take-up of the play by radial elastic deformation of said cages;
   (j) the length of said bush being equal to the total thickness of said inner cages and said spacer rings, reduced by compression enabling said play to be taken up;
   (k) said inner cages being applied to said bush, and said outer cages being applied to said cylindrical wall.

2. Motion conversion mechanism according to claim 1, wherein the length of said bush and the thicknesses of said spacer rings are determined so that said bush is supported at its ends on said two portions of said yoke to take up the pre-stressing force exceeding the force necessary for taking up play.

3. Motion conversion mechanism according to claim 1 or 2, comprising at least four stacked bearings.

4. Motion conversion mechanism according to claim 1 or 2, wherein said spacer rings inserted between said inner cages are fitted without slack onto said bush.

5. Motion conversion mechanism according to claim 1, wherein said spacer rings are inserted between said outer cages for said bearings to form with the latter a stack fastened to said cross-piece along said cylindrical wall of said central housing.

* * * * *

UNITED STATES PATENT AND TRADEMARK OFFICE
CERTIFICATE OF CORRECTION

PATENT NO. : 4,513,630
DATED : April 30, 1985
INVENTOR(S) : Gerard Pere and Roger Badaut It is certified that error appears in the above-identified patent and that said Letters Patent is hereby corrected as shown below:

Title page:

The first sentence of the abstract of the disclosure should read --A mechanism for converting rotary motion into rectilinear to and fro motion, comprising a plate oscillating around a center and hinged in the housing of a crosspiece by a pre-stressed rod and conical bearing.-- instead of the way it appears in the patent.

Signed and Sealed this
Nineteenth Day of April, 1988

Attest:

DONALD J. QUIGG

*Attesting Officer*          *Commissioner of Patents and Trademarks*